(No Model.)

C. H. BACON.
PROPORTIONAL WATER METER.

No. 530,074. Patented Nov. 27, 1894.

WITNESSES:
A. D. Harrison.
Katharine E. Brown.

INVENTOR:
Charles H. Bacon,
by Wright, Brown & Crossley
Attys.

UNITED STATES PATENT OFFICE.

CHARLES H. BACON, OF BOSTON, MASSACHUSETTS; SARAH A. BACON ADMINISTRATRIX OF SAID CHARLES H. BACON, DECEASED, ASSIGNORS, BY DIRECT AND MESNE ASSIGNMENTS, TO WILLIAM H. ALLEN AND WILLIAM H. ALLEN, TRUSTEE, OF MELROSE, MASSACHUSETTS.

PROPORTIONAL WATER-METER.

SPECIFICATION forming part of Letters Patent No. 530,074, dated November 27, 1894.

Application filed January 13, 1893. Serial No. 458,213. (No model.)

*To all whom it may concern:*

Be it known that I, CHARLES H. BACON, of Boston, in the county of Suffolk and State of Massachusetts, have invented certain new and useful Improvements in Water-Meters, of which the following is a specification.

This invention has relation to that class of water-meters adapted for measuring a particular percentage of the water flowing from the source of supply, so that the total amount of the outflow may be accurately ascertained.

It is the object of my invention to provide such improvements in water-meters of the kind mentioned as will make the device absolutely exact in its measurements, entirely practical in its operations, and in which the percentage of water measured may be saved and drawn off through the same faucet with the balance or unmeasured quantity, so that no loss or waste of water may be had.

To these ends the invention consists of the improvements which I will now proceed to describe and claim.

Reference is to be had to the annexed drawings and to the letters marked thereon forming a part of this specification, the same letters designating the same parts or features, as the case may be, wherever they occur.

Figure 2:
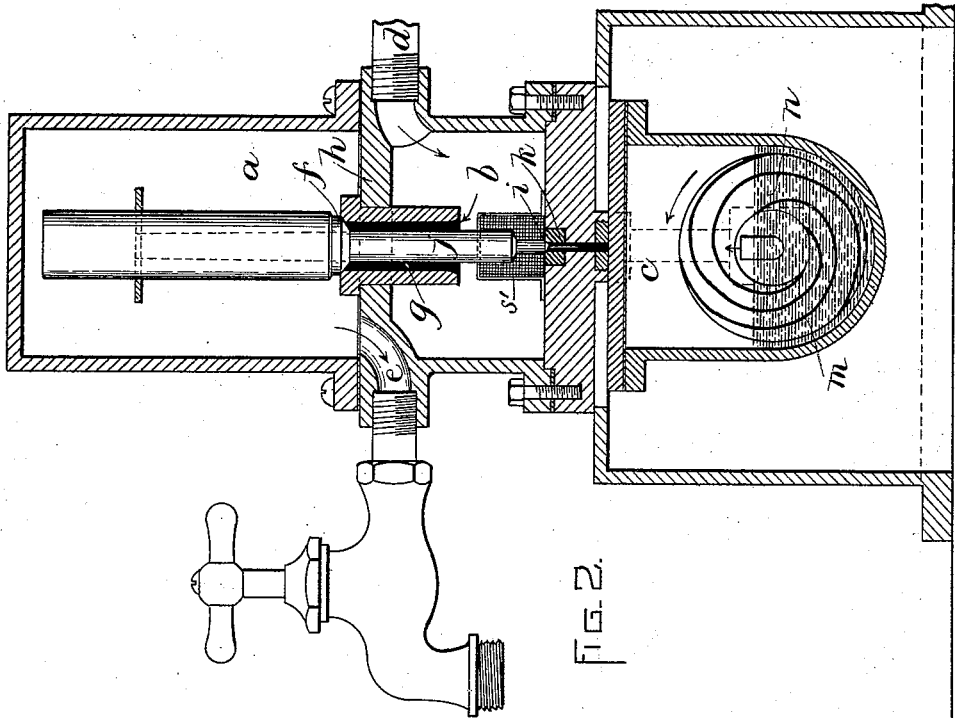
Figure 1:
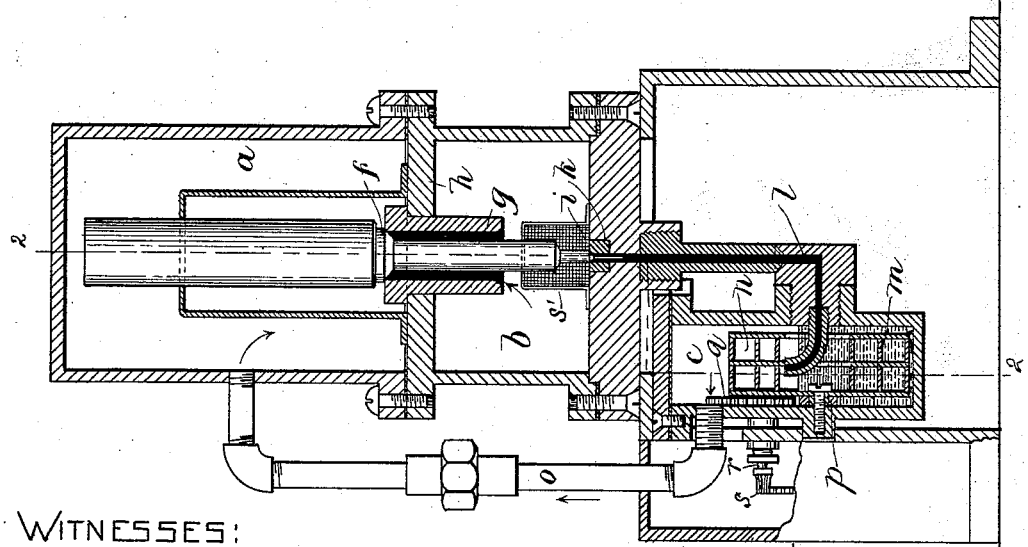

Of the drawings—Figure 1 is a vertical sectional view of my improved water meter. Fig. 2 is a like sectional view taken on a line at right angles to that on which the view in Fig. 1 is taken.

My improved meter comprises three chambers or compartments $a$ $b$ and $c$, the casing or walls of which may be of any suitable form and construction.

$d$ is the influx pipe or port which communicates with the receiving chamber $b$, and $e$ is the efflux port which leads from the discharging chamber $a$.

$f$ is a weighted valve suitably seated and adapted to control the port $g$ formed in the partition $h$ which separates the chambers $a$ and $b$; and $i$ is a valve formed on the lower end of the stem $j$ of the valve $f$, the said valve $i$ being adapted to control the small port $k$ leading from the receiving chamber $b$ to a pipe or conduit $l$ which communicates with the measuring chamber $c$. The last-mentioned chamber is provided with a meter-wheel $m$ constructed somewhat on the principle of certain forms of turbines, which meter-wheel is adapted to receive the water passing through the port $k$, at the center thereof through the medium of the pipe or conduit $l$, in two or more tangential buckets $n$, and discharge said water at its periphery.

The meter-wheel $m$ is immersed in quicksilver, as shown to a line above its axis, which serves as an abutment to the water to operate the meter-wheel and renders it certain that no water can escape without passing through the spiral buckets, as will be best understood from an inspection of Fig. 2.

$o$ is a pipe leading from the upper part of the chamber $c$ to the chamber $a$.

The shaft or arbor of the meter-wheel $m$ is provided with a gear $p$ which meshes with and drives a gear $q$ on the inner end of an arbor $r$, the outer end of said arbor being provided with a pinion $s$ which may be so connected with suitable meter indicating devices or registers as to actuate the same.

The operation of the invention is as follows: When the faucet connected with the efflux port $e$ is opened the pressure of the water in the chamber $b$ entering through the influx port $d$, will raise the valve $f$ and consequently the valve $i$ and open the ports $g$ and $k$ to the same relative extent. The port $g$ being much larger than the port $k$, of course a greater amount of water will flow through the former than the latter. Supposing, now, that under the conditions described one hundred times more water would flow through the port $g$ than through the port $k$, and that the latter were accurately measured, it could be readily ascertained as to just how much water was drawn from the source of supply. The water flowing through the port $g$ enters the chamber $a$ and passes out through the efflux port $e$, and the water flowing through the port $k$ passes through the conduit $l$ into the measuring wheel and turns the same at a rate exactly proportionate to the volume of the water entering the spiral buckets *n*, whence it is discharged into the chamber *c*, and flows through the pipe *o* into the chamber *a* and is discharged with the water flowing through the port *g* through the efflux port *e*. It will be seen that by varying the size of the port *k* with reference to the port *g*, any desired percentage of the water drawn from the source of supply may be measured by the measuring wheel *m* in the chamber *c*, and that by reason of the immersion of the measuring wheel in quicksilver to the extent shown and described, all of the water passing into the measuring wheel will be accurately measured. It is further to be noted that not any portion of the water drawn from the source of supply is wasted, but all is discharged through the faucet. If need be a strainer *s'* may be arranged about the valve *i* and port *k* to protect the same against becoming clogged by solid or semi-solid matter in the water; and any suitable means may be provided for guiding the valves *f* and *k* in their movements. The pressure of the water in the chamber *c* will be greater than in the chamber *a* in proportion to the amount of pressure required to raise the weighted valve *f*. Consequently it is rendered feasible to conduct the measured water from the chamber *c* into the chamber *a*.

Having thus explained the nature of the invention and described a way of constructing and using the same, though without attempting to set forth all of the forms in which it may be made, or all of the modes of its use, it is declared that what is claimed is—

A water-meter, comprising in its construction a receiving-chamber having an influx-port, a discharging-chamber having an efflux-port, a measuring-chamber, ports affording communication between the receiving and discharging chambers and the receiving and measuring chambers, valves controlling said ports, a meter-wheel in the measuring-chamber provided with buckets, said chamber containing mercury to a line above the axis of the wheel, a duct communicating from the receiving-chamber to the interior of the wheel, and an always-open passage affording communication between the measuring-chamber and the discharge-chamber.

In testimony whereof I have signed my name to this specifiation, in the presence of two subscribing witnesses, this 4th day of January, A. D. 1893.

CHARLES H. BACON.

Witnesses:
   ARTHUR W. CROSSLEY,
   F. PARKER DAVIS.